United States Patent
Li et al.

(10) Patent No.: US 11,729,102 B2
(45) Date of Patent: Aug. 15, 2023

(54) ACTIVE-ACTIVE CLUSTER CONTROL METHOD AND CONTROL NODE

(71) Applicant: Huawei Cloud Computing Technologies, Co., Ltd., Guizhou (CN)

(72) Inventors: Junwu Li, Beijing (CN); Si Shen, Beijing (CN)

(73) Assignee: HUAWEI CLOUD COMPUTING TECHNOLOGIES CO., LTD., Guizhou (CN)

(*) Notice: Subject to any disclaimer, the term of this patent is extended or adjusted under 35 U.S.C. 154(b) by 51 days.

(21) Appl. No.: 17/534,586

(22) Filed: Nov. 24, 2021

(65) Prior Publication Data

US 2022/0086092 A1    Mar. 17, 2022

Related U.S. Application Data

(63) Continuation of application No. PCT/CN2020/092025, filed on May 25, 2020.

(30) Foreign Application Priority Data

May 24, 2019 (CN) .......................... 201910437296.6

(51) Int. Cl.
*H04L 47/125* (2022.01)
*H04L 47/33* (2022.01)
(Continued)

(52) U.S. Cl.
CPC .......... *H04L 47/125* (2013.01); *H04L 45/566* (2013.01); *H04L 45/74* (2013.01); *H04L 47/33* (2013.01); *H04L 47/6295* (2013.01)

(58) Field of Classification Search
CPC ..... H04L 45/566; H04L 45/74; H04L 47/125; H04L 47/33; H04L 47/6295
See application file for complete search history.

(56) References Cited

U.S. PATENT DOCUMENTS

| 10,110,514 B2 | 10/2018 | Zhang et al. |
| 2016/0330281 A1 | 11/2016 | Narayanan et al. |

(Continued)

FOREIGN PATENT DOCUMENTS

| CN | 104410730 A | 3/2015 |
| CN | 105099779 A | 11/2015 |

(Continued)

OTHER PUBLICATIONS

Waldner, "Firewall HA with conntrackd and keepalived," Proudly uncool and out of fashion, Apr. 3, 2013, https://backreference.org/2013/04/03/firewall-ha-with-conntrackd-and-keepalived/, 7 pages.

*Primary Examiner* — George C Neurauter, Jr.
(74) *Attorney, Agent, or Firm* — Conley Rose, P.C.

(57) ABSTRACT

An active-active cluster control method includes that a control node receives a first query request from a first network processing node in an active-active cluster, configures an outbound forwarding rule based on forwarding information, generates an inbound forwarding rule, and sends the outbound forwarding rule to the first network processing node. The control node may further receive a second query request, determine that forwarding information of a second packet matches the inbound forwarding rule, obtain the recorded inbound forwarding rule, and send the inbound forwarding rule to the second network processing node.

20 Claims, 7 Drawing Sheets

(51) Int. Cl.
*H04L 47/6295* (2022.01)
*H04L 45/00* (2022.01)
*H04L 45/74* (2022.01)

(56) References Cited

U.S. PATENT DOCUMENTS

2017/0006092 A1  1/2017  Rochwerger et al.
2018/0176181 A1  6/2018  Fu et al.
2019/0036881 A1  1/2019  Kancherla et al.

FOREIGN PATENT DOCUMENTS

| | | |
|---|---|---|
| CN | 105591863 A | 5/2016 |
| CN | 106101298 A | 11/2016 |
| CN | 106506700 A | 3/2017 |
| CN | 106533890 A | 3/2017 |
| CN | 106789367 A | 5/2017 |
| CN | 106911802 A | 6/2017 |
| CN | 107800626 A | 3/2018 |
| CN | 108768817 A | 11/2018 |
| CN | 109361764 A | 2/2019 |
| CN | 109451084 A | 3/2019 |

US 11,729,102 B2

ACTIVE-ACTIVE CLUSTER CONTROL METHOD AND CONTROL NODE

CROSS-REFERENCE TO RELATED APPLICATIONS

This is a continuation of International Patent Application No. PCT/CN2020/092025 filed on May 25, 2020, which claims priority to Chinese Patent Application No. 201910437296.6 filed on May 24, 2019, the disclosures of which are hereby incorporated by reference in their entirety.

TECHNICAL FIELD

This application relates to the field of network communications technologies, and in particular, to a control method and a control node.

BACKGROUND

In network communication, to prevent a client from being exposed to a public network, the client may be disposed in a private network. The client in the private network is connected to the public network by using a network processing node, to prevent the client from being directly exposed to the public network, thereby improving privacy.

Further, to implement a high availability mechanism, the network processing node is deployed in a cluster mode.

Further, in a process of communication between the client and a server, a request packet (i.e., an outbound packet) sent by the client to the server is first routed to an active-active cluster. The active-active cluster includes a load balancer node and a plurality of network processing nodes, and the plurality of network processing nodes have a same configuration and function. The load balancer node of the active-active cluster receives the request packet, selects one first network processing node from the plurality of network processing nodes according to a load balancing policy, and sends the request packet to the selected first network processing node. The first network processing node generates forwarding rules (including an outbound forwarding rule and an inbound forwarding rule) for the request packet. After performing network processing such as source network address translation (SNAT) or an access control list (ACL) according to the outbound forwarding rule in the forwarding rules, the first network processing node sends a request packet obtained after the network processing to the server. Correspondingly, the server generates a response packet (i.e., an inbound packet) based on the request packet obtained after the network processing, and sends the response packet to the active-active cluster. The load balancer node of the active-active cluster receives the request packet, and selects one second network processing node from the plurality of network processing nodes according to the load balancing policy. After performing network processing such as destination network address translation (DNAT) or an ACL on the response packet according to the inbound forwarding rule in the forwarding rules, the second network processing node sends a request packet obtained after the network processing to the client. In the foregoing process, when the second network processing node and the first network processing node are not a same node, the second network processing node needs to obtain the inbound forwarding rule from the first network node, to process the response packet according to the inbound forwarding rule.

Because the load balancer node selects the second network processing node according to the load balancing policy, selection of the second network processing node depends on the load balancing policy, and has uncertainty. In general, the first network processing node needs to send the inbound forwarding rule to all network processing nodes in the active-active cluster except the first network processing node.

When the first network processing node synchronizes the forwarding rules in the active-active cluster in a unicast or multicast manner, if the second network processing node does not receive the inbound forwarding rule before receiving the response packet, the second network processing node cannot correctly process the response packet. Consequently, problems such as a packet loss and communication service interruption are caused.

Therefore, how to implement reliable synchronization of the forwarding rules becomes an urgent problem to be resolved currently.

SUMMARY

This application provides an active-active cluster control method and a control node, to implement reliable synchronization of forwarding rules between network devices in an active-active cluster, and avoid problems such as a packet loss and service interruption.

According to a first aspect, an active-active cluster control method is provided. The method includes that a control node receives a first query request sent by a first network processing node in the active-active cluster, where the first query request carries forwarding information of a first packet, and the forwarding information of the first packet records a sending direction of the first packet as an outbound direction. The control node configures an outbound forwarding rule based on the forwarding information of the first packet, generates an inbound forwarding rule whose direction is opposite to that of the outbound forwarding rule, records the outbound forwarding rule and the inbound forwarding rule, and sends the outbound forwarding rule to the first network processing node. The control node receives a second query request sent by a second network processing node in the active-active cluster, where the second query request carries forwarding information of a second packet, and the forwarding information of the second packet records a sending direction of the second packet as an inbound direction. The control node determines that the forwarding information of the second packet matches the inbound forwarding rule, obtains, based on the forwarding information of the second packet, the recorded inbound forwarding rule, and sends the inbound forwarding rule to the second network processing node.

Further, the outbound forwarding rule may be generated based on the forwarding information of the first packet. The outbound forwarding rule is used to indicate a network processing node, in the active-active cluster, that receives the outbound forwarding rule to process the first packet. In addition, the inbound forwarding rule whose direction is opposite to that of the outbound forwarding rule may be further generated according to the outbound forwarding rule. The inbound forwarding rule is used to indicate a network processing node, in the active-active cluster, that receives the outbound forwarding rule to process the second packet.

In a first possible implementation of the first aspect, the control node records a public Internet Protocol (IP) address and a range of available public network ports. The control node selects a public network port from the range of public network ports. The public network port one-to-one corresponds to the source IP address and the source port that are of the first packet. The outbound forwarding rule includes a correspondence between the source IP address and the source port that are of the first packet and the public IP address and the public network port. The outbound forwarding rule is used to indicate a network processing node, in the active-active cluster, that receives the outbound forwarding rule to modify a source IP address of a packet whose sending direction is the outbound direction to the public IP address, and modify a source port of the packet whose sending direction is the outbound direction to the public network port.

In the first aspect or the first possible implementation of the first aspect, the control node generates the inbound forwarding rule based on the correspondence that is recorded in the outbound forwarding rule and that is between the source IP address and the source port that are of the first packet and the public IP address and the public network port. The inbound forwarding rule includes the correspondence between the source IP address and the source port that are of the first packet and the public IP address and the public network port. The inbound forwarding rule is used to indicate a network processing node, in the active-active cluster, that receives the inbound forwarding rule to modify a destination IP address of a packet whose sending direction is the inbound direction to the source address of the first packet, and modify a destination port of the packet whose sending direction is the inbound direction to the source port of the first packet.

In the first aspect or the first possible implementation of the first aspect, the forwarding information of the second packet includes a destination IP address and a destination port that are of the second packet. The control node determines that the destination IP address of the second packet is the public IP address, and determines that the destination port of the second packet is the public network port.

In the first aspect or the first possible implementation of the first aspect, the first packet is sent by a client to a server, the client and the active-active cluster are set in a virtual private cloud (VPC) network, and the public IP address is set in the VPC network.

In a second possible implementation of the first aspect, the control node configures the outbound forwarding rule based on the source network address and the destination network address that are of the first packet. The outbound forwarding rule includes a correspondence between the source network address and the destination network address that are of the first packet. The outbound forwarding rule is used to indicate a network processing node, in the active-active cluster, that receives the outbound forwarding rule to determine whether a destination network address of a packet whose sending direction is the outbound direction is a preset network address. If the destination network address of the packet whose sending direction is the outbound direction is the preset network address, the control node sends the packet whose sending direction is the outbound direction based on the destination network address of the packet whose sending direction is the outbound direction. If the destination network address of the packet whose sending direction is the outbound direction is not the preset network address, the control node discards the packet whose sending direction is the outbound direction.

In the second possible implementation of the first aspect, the control node configures the inbound forwarding rule based on the source network address and the destination network address that are of the first packet and that are recorded in the outbound forwarding rule. The inbound forwarding rule includes the correspondence between the source network address and the destination network address that are of the first packet. The inbound forwarding rule is used to indicate a network processing node, in the active-active cluster, that receives the inbound forwarding rule to determine whether a destination network address of a packet whose sending direction is the inbound direction is the source network address of the first packet. If the destination network address of the packet whose sending direction is the inbound direction is the source network address of the first packet, the control node sends the packet whose sending direction is the inbound direction based on the destination network address of the packet whose sending direction is the inbound direction. If the destination network address of the packet whose sending direction is the inbound direction is not the source network address of the first packet, the control node discards the packet whose sending direction is the inbound direction.

In the second possible implementation of the first aspect, the control node determines that the destination network address of the second packet is the source network address of the first packet.

According to a second aspect, a control node is provided, including a receiving module configured to receive a first query request sent by a first network processing node in the active-active cluster, where the first query request carries forwarding information of a first packet, and the forwarding information of the first packet records a sending direction of the first packet as an outbound direction, a configuration module configured to configure an outbound forwarding rule based on the forwarding information of the first packet, generate an inbound forwarding rule whose direction is opposite to that of the outbound forwarding rule, record the outbound forwarding rule and the inbound forwarding rule, and send the outbound forwarding rule to the first network processing node, where the receiving module is further configured to receive a second query request sent by a second network processing node in the active-active cluster, the second query request carries forwarding information of a second packet, and the forwarding information of the second packet records a sending direction of the second packet as an inbound direction, and a determining module configured to determine that the forwarding information of the second packet matches the inbound forwarding rule, obtain, based on the forwarding information of the second packet, the recorded inbound forwarding rule, and send the inbound forwarding rule to the second network processing node.

In a first possible implementation of the second aspect, the control node records a public IP address and a range of available public network ports, and the forwarding information of the first packet includes a source IP address and a source port that are of the first packet, and the configuration module is specially configured to select a public network port from the range of public network ports. The public network port one-to-one corresponds to the source IP address and the source port that are of the first packet. The outbound forwarding rule includes a correspondence between the source IP address and the source port that are of the first packet and the public IP address and the public network port. The outbound forwarding rule is used to indicate a network processing node, in the active-active cluster, that receives the outbound forwarding rule to modify a source IP address of a packet whose sending direction is the outbound direction to the public IP address, and modify a source port of the packet whose sending direction is the outbound direction to the public network port.

In the second aspect or the first possible implementation of the first aspect, the configuration module is further configured to generate the inbound forwarding rule based on the correspondence that is recorded in the outbound forwarding rule and that is between the source IP address and the source port that are of the first packet and the public IP address and the public network port. The inbound forwarding rule includes the correspondence between the source IP address and the source port that are of the first packet and the public IP address and the public network port. The inbound forwarding rule is used to indicate a network processing node, in the active-active cluster, that receives the inbound forwarding rule to modify a destination IP address of a packet whose sending direction is the inbound direction to the source address of the first packet, and modify a destination port of the packet whose sending direction is the inbound direction to the source port of the first packet.

In the second aspect or the first possible implementation of the first aspect, the forwarding information of the second packet includes a destination IP address and a destination port that are of the second packet, and the determining module is further configured to determine that the destination IP address of the second packet is the public IP address, and determine that the destination port of the second packet is the public network port.

In the second aspect or the first possible implementation of the second aspect, the first packet is sent by a client to a server, the client and the active-active cluster are set in a VPC network, and the public IP address is set in the VPC network.

In a second possible implementation of the second aspect, the forwarding information of the first packet includes the source network address and a destination network address of the first packet, and the configuration module is further configured to configure the outbound forwarding rule based on the source network address and the destination network address that are of the first packet. The outbound forwarding rule includes a correspondence between the source network address and the destination network address that are of the first packet. The outbound forwarding rule is used to indicate a network processing node, in the active-active cluster, that receives the outbound forwarding rule to determine whether a destination network address of a packet whose sending direction is the outbound direction is a preset network address. If the destination network address of the packet whose sending direction is the outbound direction is the preset network address, the configuration module sends the packet whose sending direction is the outbound direction based on the destination network address of the packet whose sending direction is the outbound direction. If the destination network address of the packet whose sending direction is the outbound direction is not the preset network address, the configuration module discards the packet whose sending direction is the outbound direction.

In the second possible implementation of the second aspect, the configuration module is further configured to configure the inbound forwarding rule based on the source network address and the destination network address that are of the first packet and that are recorded in the outbound forwarding rule. The inbound forwarding rule includes the correspondence between the source network address and the destination network address that are of the first packet. The inbound forwarding rule is used to indicate a network processing node, in the active-active cluster, that receives the inbound forwarding rule to determine whether a destination network address of a packet whose sending direction is the inbound direction is the source network address of the first packet. If the destination network address of the packet whose sending direction is the inbound direction is the source network address of the first packet, the configuration module sends the packet whose sending direction is the inbound direction based on the destination network address of the packet whose sending direction is the inbound direction. If the destination network address of the packet whose sending direction is the inbound direction is not the source network address of the first packet, the configuration module discards the packet whose sending direction is the inbound direction.

In the second possible implementation of the second aspect, the forwarding information of the second packet includes the destination network address of the second packet. The determining module is further configured to determine that the destination network address of the second packet is the source network address of the first packet.

According to a third aspect, a control node is provided, including a processor and a memory. The memory is configured to store computer-executable instructions, and when the control device runs, the processor executes the computer-executable instructions in the memory to perform, by using the control device, the method steps in any one of the first aspect or the possible implementations of the first aspect.

According to a fourth aspect, a computer-readable storage medium is provided. The computer-readable storage medium stores program instructions, and when the program instructions are run by a control node, the control node performs the method in any one of the first aspect or the possible implementations of the first aspect.

According to a fifth aspect, a computer program product is provided, including program instructions. When the program instructions are run by a control node, the control node performs the method according to any one of the first aspect and the possible implementations of the first aspect.

Based on the implementations provided in the foregoing aspects, this application may be further combined to provide more implementations.

DESCRIPTION OF EMBODIMENTS

The following describes technical solutions of this application with reference to accompanying drawings.

With rise of an internet and big data, there is an increasing demand for network bandwidth. Generally, a network node is deployed in a cluster mode, to implement a high availability mechanism. The following describes in detail a system architecture 100 in an embodiment of this application with reference to FIG. 1.

Figure 1:
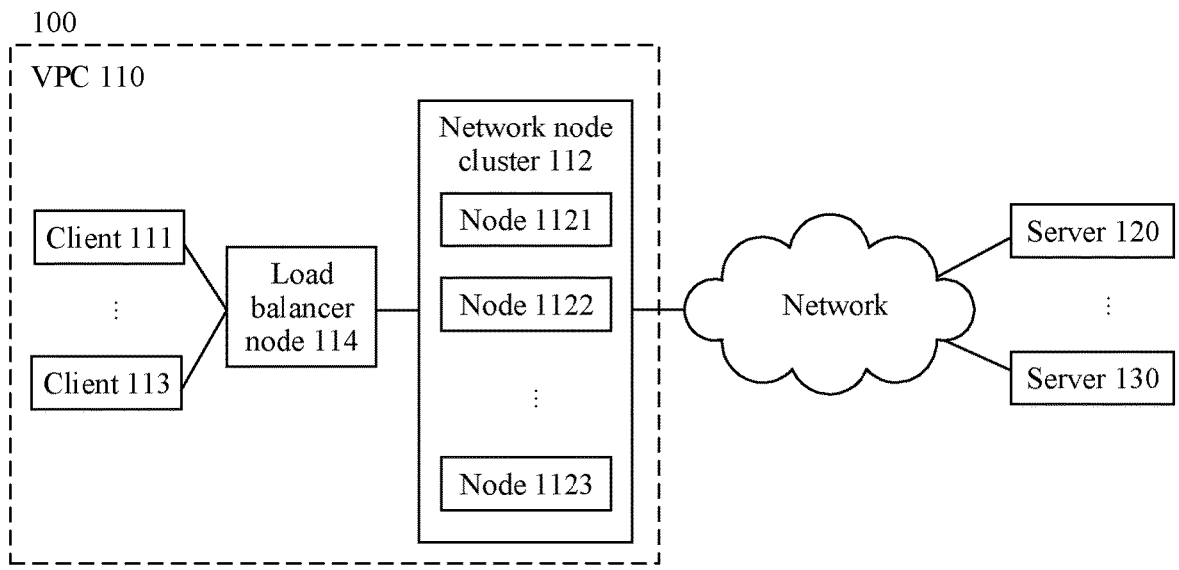
FIG. 1 is a schematic block diagram of a system architecture 100 for packet traffic forwarding.

FIG. 1 is a schematic block diagram of a system architecture 100 for packet traffic forwarding. As shown in FIG. 1, the system architecture 100 may include a VPC 110 and at least one server (for example, a server 120 and a server 130). The following separately describes the foregoing modules in detail.

The VPC 110 includes at least one client (for example, a client 111 and a client 113) and a network node cluster 112. The network node cluster 112 may include at least one network processing node. For ease of description, in this embodiment of this application, an example in which the network node cluster 112 includes nodes 1121, 1122, and 1123 is used for description.

It should be understood that the VPC 110 may also be replaced with a data center. This is not limited in this embodiment of this application.

It should be further understood that the client may be a virtual machine (VM) or a container. In addition, when the VPC 110 is replaced with the data center, the client may alternatively be a physical device. This is not limited in this embodiment of this application.

The client and the client may first send, to a node in the network node cluster 112, a request packet sent to the server. The network processing node in the network node cluster 112 performs traffic processing on the request packet and then forwards the request packet to the server.

For example, a load balancer node 114 in the VPC 110 receives a request packet sent by the client 111, and distributes, according to a load balancing policy, the request packet to a node in the network node cluster 112 for processing, to implement load balancing.

The load balancer node 114 may be further implemented in a plurality of manners. This is not limited in this embodiment of this application. In an example, the load balancer node 114 may be a load balancer. The load balancer may form a hash algorithm based on a combination of a destination address, a destination port, a source address, a source port, and a protocol number that are of the request packet, and perform distribution processing on the request packet based on a result of the hash algorithm, thereby implementing traffic load balancing of the request packet. In another example, the load balancer node 114 may alternatively be an equal-cost multi-path (ECMP) device, or a Link Aggregation Control Protocol (LACP) device.

In this embodiment of this application, an outbound packet sent by a client in a private network is routed to the load balancer node 114 before being sent to a public network, and an inbound packet sent by a server in the public network is routed to the load balancer node 114 before reaching the private network.

It should be understood that the destination address, the destination port, the source address, the source port, and the protocol type of the request packet mentioned before are forwarding information of the request packet.

It should be further understood that the load balancer in this embodiment of this application may be a layer 3 (L3) load balancer, or may be a layer 7 (L7) load balancer.

The network node cluster 112 is not further limited in this embodiment of this application. In an example, the network node cluster 112 may be a SNAT cluster, and is responsible for modifying the source address of the request packet. For example, the client 111 sends the request packet to the server 120. The source address of the request packet is an IP address of the client 111. The network node cluster 112, as the SNAT cluster, may modify the source address of the request packet from the IP address of the client 111 to a unified external IP address (generally an external address of a gateway) of the data center 110. In another example, the network node cluster 112 may alternatively be a DNAT cluster, and is responsible for modifying a destination address of a response packet. For example, the server 120 sends a response packet to the client 111, and a destination address of the response packet is the unified external IP address of the data center 110. The network node cluster 112, as the DNAT cluster, may modify the destination address of the response packet from the unified external IP address of the data center 110 to the IP address of the client 111. In another example, the network node cluster 112 may alternatively be a firewall (FW) cluster. A security protection policy is deployed in the network node cluster 112, and the network node cluster 112 is responsible for performing a security check, a permission check, and the like on a request packet or a response packet.

It should be noted that the unified external address of the VPC 110 may also be referred to as a public IP (PIP) address and is referred to as a public IP address for short.

The network processing node in the network node cluster 112 may be a physical device, or may be a virtual machine. This is not limited in this embodiment of this application.

In a process of processing the request packet sent by the client, a node in the network node cluster 112 records the forwarding information of the request packet. The forwarding information may include but is not limited to 5-tuple structure information of the packet. When the response packet passes through the node in the network node cluster 112, the node in the network node cluster 112 determines whether there is information about a corresponding request packet. If the response packet has the corresponding request packet, traffic that depends on or is associated with the response packet and the corresponding request packet is referred to as stateful traffic. If the response packet does not have the corresponding request packet, traffic that does not depend on or is not associated with the response packet and the corresponding request packet is referred to as stateless traffic.

Further, after receiving the request packet, the node in the network node cluster 112 may record the destination address, the destination port, the source address, the source port, and the protocol number that are of the request packet. Further, after receiving the response packet, the node in the network node cluster 112 may record a destination address, a destination port, a source address, a source port, and a protocol number that are of the response packet. If the protocol number of the request packet is the same as that of the response packet, the destination address of the request packet is the source address of the response packet, the destination port of the request packet is the source port of the response packet, the destination address of the response packet is the source address of the request packet, and the destination port of the response packet is the source port of the request packet, traffic associated with the request packet and the response packet may be understood as stateful traffic.

For the stateful traffic, the request packet and the response packet need to be processed by a same node in the network node cluster 112. Further, the network node cluster 112 is a stateful cluster, and the node in the network node cluster 112 needs to store a related forwarding rule, so that after receiving the response packet, the node in the network node cluster 112 may determine, according to the forwarding rule stored in the node, that the traffic associated with the response packet is stateful traffic, and performs traffic processing on the response packet.

It should be understood that the forwarding rule may also be understood as a forwarding rule for processing a packet. A representation form of the forwarding rule is not limited in this embodiment of this application. For example, the forwarding rule may be a flow table, or may be a routing rule.

For example, the network node cluster 112 is a network address translation (NAT) cluster, and the forwarding rule may be a forwarding rule based on 5-tuple structure information of the request packet. After receiving the request packet sent by the client 111 to the server 120, the node in the network node cluster 112 records the 5-tuple structure information of the request packet. In addition, according to the locally stored forwarding rule that is based on the 5-tuple structure information, the source address of the request packet is modified from the IP address of the client 111 to a unified public IP address of the data center 110 or a unified public IP network address of an enterprise internal network, and the request packet is forwarded to the server 120.

After receiving the response packet sent by the server 120 to the client 111, the node in the network node cluster 112 determines, based on the 5-tuple structure of the response packet and the forwarding rule stored in the node, whether the traffic is stateful traffic. When the response packet is stateful traffic, the node modifies, according to the locally stored forwarding rule, the destination address of the response packet from the unified external IP address of the data center 110 to the IP address of the client 111, and forwards the response packet to the client 111.

For the stateful traffic, the request packet and the response packet need to be processed by the same node in the network node cluster 112. The traffic processing is performed based on stored stateful traffic. However, packet traffic is sent to the node in the network node cluster 112 by using the load balancer node 114. Therefore, the request packet and the response packet corresponding to the request packet may not be processed by the same node in the network node cluster 112. Therefore, the node in the network node cluster 112 needs to synchronize the stored forwarding rule, so that after receiving the response packet, the node may process the response packet according to the stored forwarding rule. In this way, a packet loss caused by a lack of the forwarding rule is avoided.

For example, the network node cluster 112 is an active-active cluster. Referring to FIG. 1, the node 1121, the node 1122, and the node 1123 in the network node cluster 112 may simultaneously process the packet traffic. When a node is faulty, traffic on the node is distributed to another node in the network node cluster 112 for processing. In a conventional technical solution, a forwarding rule is synchronized among the node 1121, the node 1122, and the node 1123 in a multicast manner.

For example, the network node cluster 112 is an active-standby cluster. Referring to FIG. 1, in all nodes in the network node cluster 112, only one node that processes traffic is referred to as a master node (master), and another node (generally referred to as a slaver node (slaver)) becomes a master node and starts to process traffic after the master node is faulty. In the conventional technical solution, a master node in the network node cluster 112 stores a forwarding rule, and the master node synchronizes the forwarding rule to another slaver node in a unicast manner.

In the foregoing technical solutions in which the forwarding rule is synchronized in the unicast or multicast manner, it is prone to cause the packet loss and service interruption. First, in a process that the forwarding rule is synchronized in the unicast or multicast manner, the forwarding rule is not synchronized in real time. Therefore, it is prone to cause the packet loss and the service interruption. Then, if time for processing a message in the unicast or multicast manner is longer than time for returning the response packet corresponding to the request packet to the node in the network node cluster 112, the packet loss and the service interruption may also be caused. In addition, for the active-active cluster, because it is not determined that the response packet is forwarded to a specific node in the network node cluster 112, all nodes in the network node cluster 112 need to receive and store all forwarding rules. Consequently, an overall capacity specification is limited.

According to an active-active cluster control method provided in this embodiment of this application, for the active-active cluster of the network node cluster 112, a forwarding rule of each node in the network node cluster 112 may be stored in an independent control node. In a process in which each node in the network node cluster 112 processes traffic, if the node does not locally store a forwarding rule, the node may obtain the forwarding rule from the independent control node, to implement reliable synchronization of the forwarding rules and avoid the packet loss, the service interruption, and the like. In addition, the forwarding rules are stored in the independent control node, and there is no need to store the forwarding rules on each node, thereby improving the overall capacity specification of the cluster service.

With reference to the architecture shown in FIG. 1, the following describes in detail a packet traffic processing method provided in this embodiment of this application by using an example in which the network node cluster 112 is a NAT cluster.

It should be noted that the forwarding rule may be stored in a cache of the control node, or may be stored in a configuration management database (CMDB) of the control node. This is not limited in this embodiment of this application.

Figure 2:
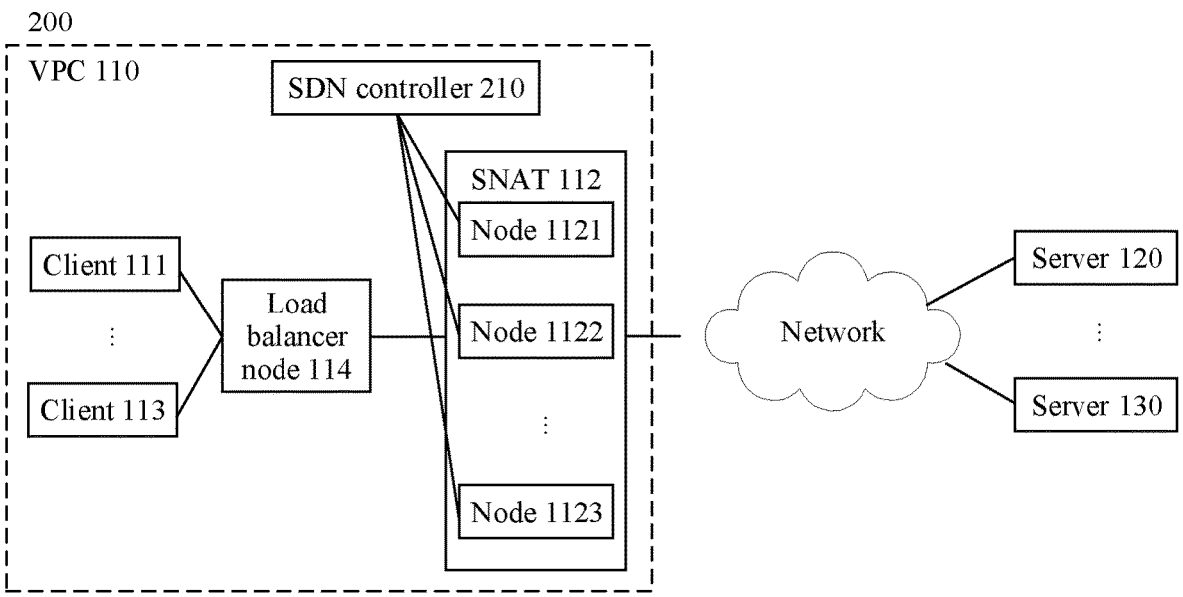
FIG. 2 is a schematic block diagram of a system architecture 200 for packet traffic forwarding according to an embodiment of this application.

FIG. 2 is a schematic block diagram of a system architecture 200 for packet traffic forwarding according to an embodiment of this application. As shown in FIG. 2, a control node 210 is added to the system architecture 200 based on the system architecture 100 shown in FIG. 1.

It should be noted that the control node 210 may be located inside a VPC 100, or may be located outside the VPC 100. This is not limited in this embodiment of this application. For ease of description, in FIG. 2, an example in which the control node 210 is located inside the VPC 100 is used for description.

The control node 210 may store a forwarding rule. After receiving packet traffic, any node in a network node cluster 112 obtains the forwarding rule from the control node 210, and processes the packet traffic according to the forwarding rule.

It should be noted that the control node 210 may be centralized, or may be distributed. This is not limited in this embodiment of this application.

Optionally, in some embodiments, the control node 210 may be a software-defined networking (SDN) controller. The SDN controller may generate a forwarding rule after receiving forwarding information that is of a request packet and that is reported by any node in the network node cluster 112, and deliver the generated forwarding rule to the node in the network node cluster 112, so that the node processes, according to the forwarding rule, the request packet or a response packet corresponding to the request packet.

Figure 3A:
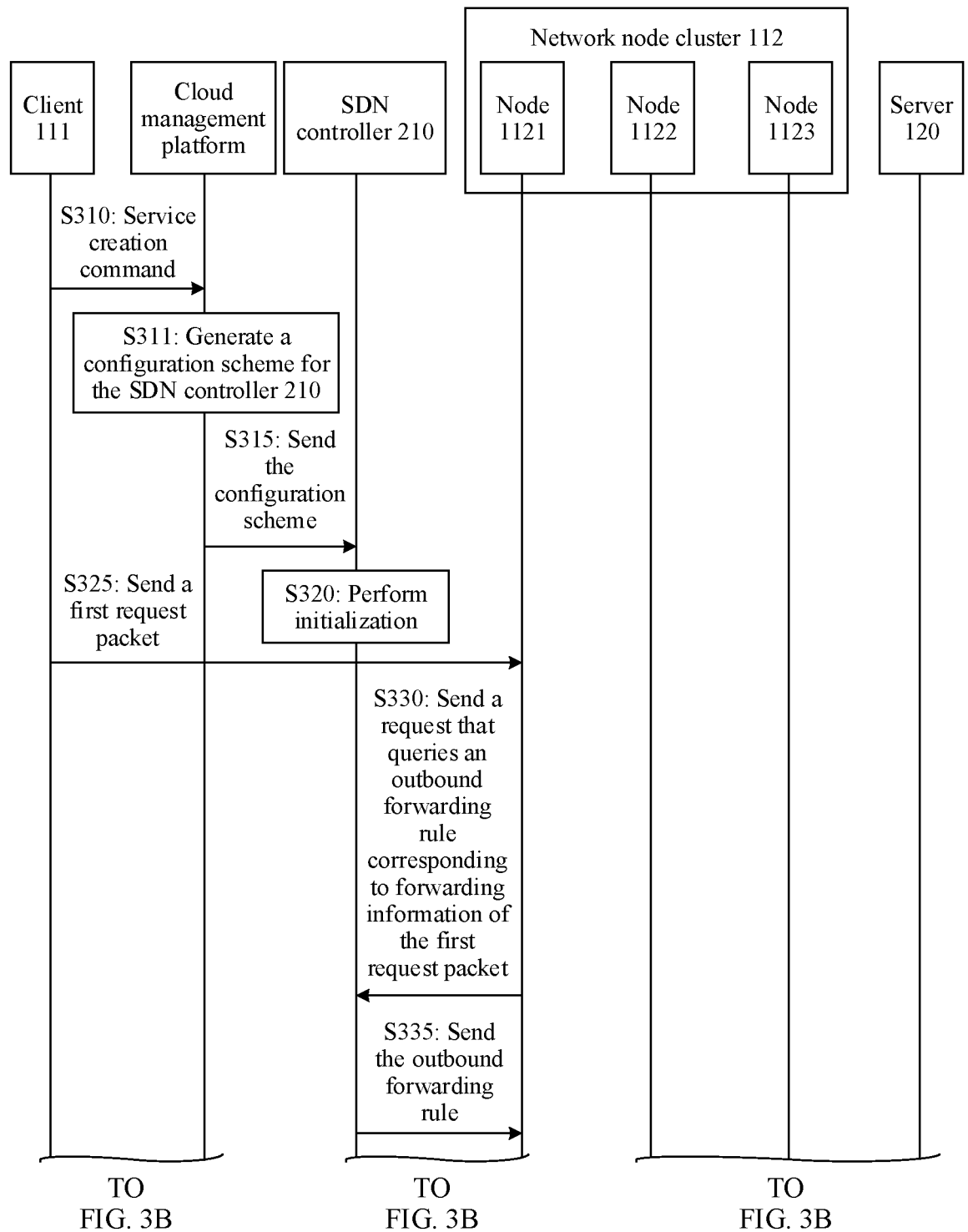
FIG. 3A and FIG. 3B are schematic flowcharts of a packet traffic processing method according to an embodiment of this application.
Figure 3B:
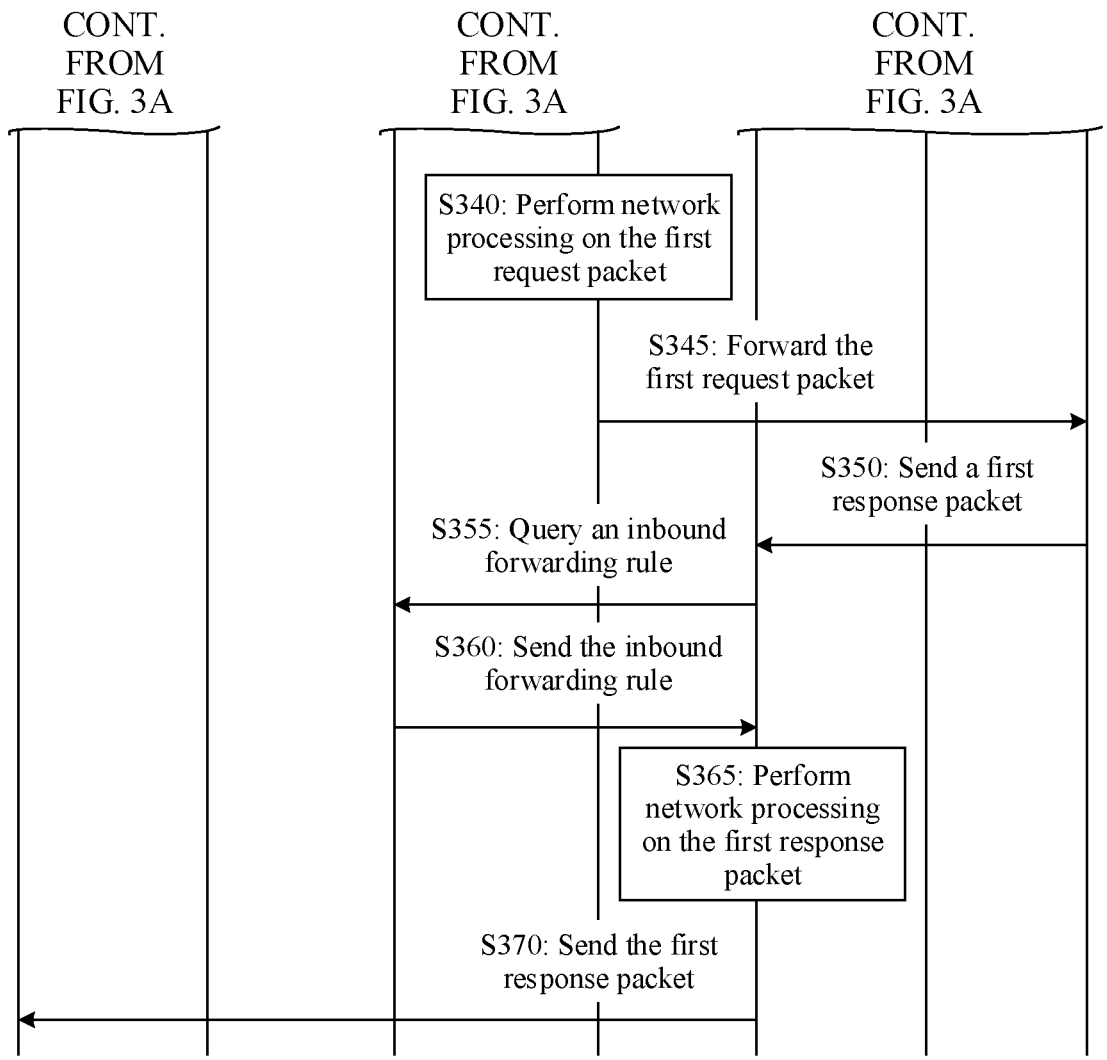

The following describes in detail a packet traffic processing method provided in an embodiment of this application with reference to FIG. 3A and FIG. 3B by using an example in which the network node cluster 112 shown in FIG. 2 is a NAT cluster, and the control node 210 is an SDN controller.

FIG. 3A and FIG. 3B are schematic flowcharts of a packet traffic processing method according to an embodiment of this application. The method shown in FIG. 3A and FIG. 3B may include steps 310 to 370. The following separately describes steps 310 to 370 in detail.

Step 310: A tenant sends a service creation command to a cloud management platform.

The tenant may send the service creation command to the cloud management platform. There is a plurality of specific implementations. This is not limited in this application. In an example, the tenant may send the service creation command by using a console on the cloud management platform. In another example, the tenant may further send the service creation command by using an application programming interface (API) on a cloud platform.

In a possible implementation, in this embodiment of this application, the tenant may send the service creation command by using a VPC as a granularity. It should be understood that all clients in the VPC share at least one public IP address, and access an external network by using the public IP address.

Step 311: The cloud management platform generates a configuration scheme for an SDN controller according to the service creation command.

The cloud management platform may generate the configuration scheme for the SDN controller 210 according to the service creation command. The configuration scheme may indicate the SDN controller 210 to create a NAT service and perform initialization.

Optionally, in some embodiments, the service creation command sent by the tenant to the cloud management platform may include a range of available public network ports, and the configuration scheme generated by the cloud management platform for the SDN controller 210 may include the range of available public network ports, so that the SDN controller 210 selects one public network port from the range of available public network ports. The public network port one-to-one corresponds to a source IP address and a source port of a first request packet.

Step 315: The SDN controller 210 receives the configuration scheme sent by the cloud management platform.

Step 320: The SDN controller 210 performs initialization.

After receiving the configuration scheme sent by the cloud platform, the SDN controller 210 parses and creates the NAT service. The SDN controller 210 may further allocate an available public IP address to the client in the VPC, and create an empty NAT forwarding configuration library corresponding to the NAT service. The NAT forwarding configuration library may store a NAT forwarding rule.

The SDN controller 210 may further configure a forwarding plane for each node in a network node cluster 112.

Further, the SDN controller 210 delivers an OPENFLOW flow table to each node in the network node cluster 112. The OPENFLOW flow table is used to indicate each node in the network node cluster 112 to send a query request to the SDN controller 210 when forwarding information of a received packet does not match the locally stored NAT forwarding entry.

Each node in the network node cluster 112 is configured with an internal network adapter and an external network adapter. The internal network adapter is connected to a private network, and the external network adapter is connected to a public network. The node may modify the received packet according to the forwarding rule, and select, based on a destination address of a modified packet, a network adapter to send the modified packet. For example, when the destination address of the modified packet is a private network address, the internal network adapter is selected to send the modified packet to the private network. When the destination address of the modified packet is a public network address, the external network adapter is selected to send the modified packet to the public network.

It should be understood that when each node in the network node cluster 112 is a physical device, the network adapter may be a physical adapter, and when each node in the network node cluster 112 is a virtual machine, the network adapter may be a virtual adapter.

Step 325: A node 1121 receives the first request packet sent by a client 111 to a server 120.

For example, the client 111 sends the first request packet to the server 120, and the first request packet may be routed to a load balancer node 114. For example, a default gateway of the client 111 may be set to a network address of the load balancer node 114. When a destination address and the source address that are of the first request packet are not in a same range of subnets, the first request packet may be routed to the default gateway, the load balancer node 114 selects the node 1121 according to a load balancing policy, and sends the first request packet to the node 1121 in the network node cluster 112. The source IP address of the first request packet is an IP address of the client 111, and the destination address of the first request packet is an IP address of the server 120.

The first request packet sent by the client 111 to the server 120 may carry forwarding information, and the forwarding information records a sending direction of the first request packet as an outbound direction.

It should be understood that in this embodiment of this application, the outbound direction is a direction from the client to the server, and an inbound direction is a direction from the server to the client. The outbound direction may be understood as a packet sent from the client in the VPC 110 to the server outside the VPC 110, or a packet sent from a client in a local area network to a server outside the local area network. The inbound direction may be understood as a packet sent from the server outside the VPC 110 to the client in the VPC 110, or a packet sent from the server outside the local area network to the client in the local area network.

Step 330: The node 1121 sends the query request to the SDN controller 210, where the query request is used to query an outbound forwarding rule corresponding to the forwarding information of the first request packet.

After receiving the first request packet sent by the client 111, the node 1121 determines, based on the forwarding information of the first request packet, whether the node 1121 locally stores the outbound forwarding rule for processing the first request packet. If the node 1121 does not locally store the outbound forwarding rule, the node 1121 reports, based on the OPENFLOW flow table delivered by the SDN controller 210, the forwarding information of the first request packet to the SDN controller 210 for query.

Step 335: The SDN controller 210 delivers the outbound forwarding rule to the node 1121.

The forwarding information of the first request packet may be, for example, 5-tuple structure information (for example, the source IP address, the source port, a destination IP address, a destination port, and a packet type that are of the first request packet) of the first request packet. After receiving the query request, send by the node 1121, that is used to query the outbound forwarding rule corresponding to the forwarding information of the first request packet, the SDN controller 210 performs query, based on the 5-tuple structure information (for example, the source IP address, the source port, the destination IP address, the destination port, and the packet type that are of the first request packet) of the first request packet, in the NAT forwarding configuration library.

Optionally, in some embodiments, if the NAT forwarding configuration library does not store the outbound forwarding rule corresponding to the first request packet, it may be understood that the first request packet is the first packet of the server 120 accessed by the client 111. The corresponding outbound forwarding rule may be generated based on the forwarding information of the first request packet, and the generated outbound forwarding rule is delivered to the node 1121. In addition, the SDN controller 210 may further generate an inbound forwarding rule whose direction is opposite to that of the outbound forwarding rule. In addition, the outbound forwarding rule and the inbound forwarding rule are stored in the NAT forwarding configuration library. Therefore, after receiving a response packet corresponding to the first request packet, another node in the network node cluster 112 may directly obtain the inbound forwarding rule from the NAT forwarding configuration library, and forwards the response packet.

The outbound forwarding rule and the inbound forwarding rule are bidirectional forwarding rules based on the forwarding information of the first request packet. The outbound forwarding rule is as follows. A source IP address of a received outbound packet is modified to the public IP address, and a source port of the received outbound packet is modified to the public network port. The inbound forwarding rule is as follows. A destination IP address of a received inbound packet is modified to the IP address of the client 111, and a destination port of the received inbound packet is modified to the source port of the first request packet.

In this embodiment of this application, the SDN controller 210 records the public IP address and the range of available public network ports. The SDN controller 210 selects one public network port from the range of available public network ports. The public network port one-to-one corresponds to the source IP address and the source port of the first request packet.

It should be understood that the range of available public network ports may be defined by an administrator.

In an example, the IP address of the client 111 is 192.168.1.100, and the IP address of the server 120 is 67.18.2.23. The source IP address of the first request packet sent by the client 111 to the server 120 is 192.168.1.100, and the source port of the first request packet is 6000. The destination IP (i.e., the IP address of the server 120) address of the first request packet is 67.18.2.23, and the destination port of the first request packet is 443. The public IP address recorded in the SDN controller 210 is 200.16.1.2, and the range of available public network ports is from 6000 to 8000.

The following describes in detail a specific implementation of the outbound forwarding rule by using an example in which the SDN controller 210 selects a public network port 8000 from the available public network port ranging from 6000 to 8000.

The outbound forwarding rule is used as an example. The source IP address of the first request packet is modified from 192.168.1.100 to 200.16.1.2, and the source port of the first request packet is modified from a port 6000 to the port 8000. After processing is performed according to the outbound forwarding rule, the source IP address of the first request packet is 200.16.1.2, the source port of the first request packet is 8000, the destination IP address of the first request packet is 67.18.2.23, and the destination port of the first request packet is 443.

In another example, a source IP address (i.e., the IP address of the server 120) of a first response packet sent by the server 120 to the client 111 is 67.18.2.23, a source port of the first response packet is 443, a destination IP address of the first response packet is 200.16.1.2, and a destination port of the first response packet is 8000. Because the destination IP address of the first response packet is the same as the source IP address of the first request packet after the processing, and the destination port of the first response packet is the same as the source port of the first request packet after the processing, it may be understood that the first response packet is stateful traffic of the first request packet, and the first response packet corresponds to the first request packet.

The inbound forwarding rule is used as an example. When the first response packet is the stateful traffic of the first request packet, the destination IP address of the first response packet is modified from 200.16.1.2 to 192.168.1.100, and the destination port of the first response packet is modified from the port 8000 to the port 6000. After processing is performed according to the inbound forwarding rule, the source IP address of the first response packet is 67.18.2.23, the source port of the first response packet is 443, the destination IP address of the first response packet is 192.168.1.100, and the destination port of the first response packet is 6000.

Optionally, in some embodiments, if the NAT forwarding configuration library stores the outbound forwarding rule corresponding to the first request packet, the SDN controller 210 may directly deliver the outbound forwarding rule to the node 1121.

Step 340: The node 1121 performs network processing on the first request packet according to the outbound forwarding rule delivered by the SDN controller 210.

The node 1121 may modify the source IP address of the first request packet to the PIP address and modify the source port of the first request packet to a port X according to the outbound forwarding rule corresponding to the first request packet, and perform forwarding based on that the destination IP address of the first request packet is the IP address of the server 120 and the destination port of the first request packet is a port 2.

For example, the node 1121 modifies the source IP address of the first request packet from 192.168.1.100 to 200.16.1.2, and modifies the source port of the first request packet from the port 6000 to the port 8000 according to the outbound forwarding rule. After the node 1121 processes the first request packet, the source IP address of the first request packet is 200.16.1.2, the source port of the first request packet is 8000, the destination IP address of the first request packet is 67.18.2.23, and the destination port of the first request packet is 443.

Step 345: The node 1121 forwards the first request packet to the server 120.

For example, the node 1121 may send the first request packet to the public network by using the external network adapter based on that the source IP address of the first request packet is 200.16.1.2, the source port of the first request packet is 8000, the destination IP address of the first request packet is 67.18.2.23, and the destination port of the first request packet is 443. The first request packet is forwarded to the server 120 (the destination IP address of the server 120 is 67.18.2.23) by using a routing device of the public network.

The packet traffic processing method provided in this embodiment of this application is further described in detail below by using FIG. 2 with reference to steps 350 to 370.

Step 350: The server 120 sends the first response packet to a node 1122.

After receiving the first request packet, the server 120 generates the first response packet based on the first request packet. The first response packet carries content required by the first request packet, for example, a web page. The first response packet carries forwarding information. The forwarding information includes the destination IP address, the destination port, the source IP address, the source port, and a protocol type. The destination IP address is the public IP address, the destination port is the public network port, the source IP address is the IP address of the server 120, and the source port is a port, of the server 120, that provides a service. Because the source address of the packet is the IP address of the server 120, and the destination port is the public network port of the VPC, the forwarding information records a sending direction of the first response packet as an inbound direction.

The first response information sent by the server 120 is routed to a load balancer node based on the destination address of the server 120. The load balancer node selects a specific node in the network node cluster 112 according to the load balancing policy, and sends the first response packet to the node.

For ease of description, the following provides description by using an example in which the first response packet sent by the server 120 is sent by the load balancer node 114 to the node 1122 in the network node cluster 112.

Step 355: The node 1122 requests the SDN controller 210 to query the inbound forwarding rule.

After receiving the first response packet sent by the server 120, the node 1122 determines the direction of the first response packet based on the forwarding information of the first response packet, for example, the source IP address, the source port, the destination IP, the destination port, and the protocol type. Because the source IP address of the first response packet is the IP address of the server, and the destination IP address of the first response packet is the public IP address, the first response packet is an inbound packet.

The node 1122 further determines, based on the forwarding information of the first response packet, whether the node 1122 locally stores the inbound forwarding rule that matches the forwarding information of the first response packet. Further, the node 1122 searches the locally stored forwarding rule for a forwarding rule for modifying the public IP address. If there is the forwarding rule for modifying the public IP address, it indicates that the node 1122 locally stores the inbound forwarding rule that matches the forwarding information of the first response packet. Otherwise, the node 1122 does not locally store the inbound forwarding rule that matches the forwarding information of the first response packet.

If the node 1122 does not locally store the inbound forwarding rule that matches the forwarding information of the first response packet, the node 1122 reports, based on the OPENFLOW flow table delivered by the SDN controller 210, the forwarding information of the first request packet to the SDN controller 210 for query.

Step 360: The node 1122 receives the inbound forwarding rule delivered by the SDN controller 210.

After receiving a query request, send by the node 1122, that is used to query the inbound forwarding rule corresponding to the first response packet, the SDN controller 210 performs query in the NAT forwarding configuration library based on the forwarding information of the first response packet (for example, the source IP address, the source port, the destination IP address, the destination port, and the packet type that are of the first response packet). If the first response packet is stateful traffic, in other words, the first response packet corresponds to the first request packet, and the NAT forwarding configuration library stores the outbound forwarding rule and the inbound forwarding rule corresponding to the outbound forwarding rule. The SDN controller 210 may deliver the inbound forwarding rule to the node 1122.

It should be understood that the SDN controller 210 may determine, based on that the destination IP address of the first response packet is the public IP address and the destination port of the first response packet is the public network port, that the first response packet is a stateful-traffic packet of the first request packet.

Optionally, in some embodiments, if the SDN controller 210 does not find the inbound forwarding rule in the NAT forwarding configuration library, it may be understood that the first response packet is not stateful traffic, but packet traffic that is actively requested to be sent by an external network device to the VPC 100. In this embodiment of this application, for security consideration, the SDN controller 210 may not generate the inbound forwarding rule corresponding to the first response packet, and the network processing node directly discards the first response packet when not obtaining the inbound forwarding rule delivered by the SDN controller 210.

Step 365: The node 1122 processes the first response packet according to the inbound forwarding rule.

Optionally, in some embodiments, after receiving the outbound forwarding rule delivered by the SDN controller 210, the node 1122 may modify the destination IP address of the first response packet from the public IP address to the IP address of the client 111 and modify the destination port from the public network port to the source port of the first request packet according to the inbound forwarding rule.

For example, based on foregoing example, the node 1122 may modify the destination IP address of the first response packet from 200.16.1.2 to 192.168.1.100 and modify the destination port of the first response packet from 8000 to 6000 according to the inbound forwarding rule. After the node 1121 processes the first response packet, the source IP address of the first response packet is 67.18.2.23, the source port of the first response packet is 443, the destination IP address of the first response packet is 192.168.1.100, and the destination port of the first response packet is 6000.

Step 370: The node 1122 forwards the first response packet to the client 111.

For example, the node 1122 may select the internal network adapter based on the destination IP address 192.168.1.100 of the first response packet, and send the first response packet from the internal network adapter to the client 111 in the private network.

Optionally, in some other embodiments, if the node 1122 does not receive the inbound forwarding rule delivered by the SDN controller 210, the node 1122 may discard the first response packet.

Optionally, in some embodiments, if a node in the network node cluster 112 is faulty, for example, the node 1122 is faulty, the load balancer node 114 no longer sends a request packet or a response packet to the faulty node 1122.

There is a plurality of specific implementations. This is not limited in this embodiment of this application. In an example, the load balancer node 114 may delete, according to an indication of the SDN controller 210, an entry for forwarding a packet to the faulty node 1122. After receiving the packet, the load balancer node 114 no longer distributes the packet to the faulty node 1122 for processing. In another example, the load balancer node 114 may further detect, based on a mechanism of an ECMP or an LACP, that the node 1122 is faulty, and no longer distribute a packet to the faulty node 1122 for processing.

It should be noted that a node fault in this embodiment of this application includes but is not limited to a network adapter fault and a network element fault that are reported by a node, and a node fault that is sensed by the SDN controller 210 (for example, the node fault is sensed in a keepalive manner).

The following describes in detail the packet processing method provided in this embodiment of this application by using an example in which the node 1122 is faulty, and the load balancer node 114 distributes packet traffic processed by the node 1122 to a node 1123 in the network node cluster 112.

In step 350, after learning that the node 1122 is faulty, the load balancer node 114 sends the first response packet that needs to be processed by the node 1122 to the node 1123 in the network node cluster 112 for processing.

In step 355, the node 1123 requests the SDN controller 210 to query the inbound forwarding rule.

After receiving the first response packet sent by the server 120, the node 1123 determines, based on the forwarding information of the first response packet, whether the node 1123 locally stores the inbound forwarding rule. If the node 1123 does not locally store the inbound forwarding rule, the node 1122 reports, based on the OPENFLOW flow table delivered by the SDN controller 210, the forwarding information of the first request packet to the SDN controller 210 for query.

In step 360, the node 1123 receives the inbound forwarding rule delivered by the SDN controller 210.

After receiving a query request, send by the node 1123, that is used to query the inbound forwarding rule corresponding to the first request packet, the SDN controller 210 stores the inbound forwarding rule in the NAT forwarding configuration library based on the forwarding information of the first response packet, and delivers the inbound forwarding rule to the node 1123.

In step 365, the node 1123 processes the first response packet according to the inbound forwarding rule.

Based on the foregoing example, the node 1123 may modify the destination IP address of the first response packet from 200.16.1.2 to 192.168.1.100 and modify the destination port of the first response packet from 8000 to 6000 according to the inbound forwarding rule. After the processing is performed according to the inbound forwarding rule, the source IP address of the first response packet is 67.18.2.23, the source port of the first response packet is 443, the destination IP address of the first response packet is 192.168.1.100, and the destination port of the first response packet is 6000.

In step 370, the node 1123 sends the first response packet to the private network by using the internal network adapter, and then forwards the first response packet to the client 111 by using a router (not shown in the figure) in the private network.

In this embodiment of this application, when a node in the network node cluster 112 is faulty, another node processes a packet by obtaining the stored NAT forwarding rule from the SDN controller 210, to avoid normal communication interruption and a packet loss because the node is faulty and the NAT forwarding rule is not synchronized in a conventional solution.

Optionally, in some embodiments, after the faulty node 1122 recovers, and after receiving traffic of a to-be-processed packet, the node 1122 may read, from the SDN controller 210 based on forwarding information of the traffic of the to-be-processed packet, a stored forwarding rule for processing the to-be-processed packet.

Optionally, in some embodiments, if the node in the network node cluster 112 does not receive, in a period of time, a packet that needs to be processed, the node deletes the locally stored forwarding rule for processing the packet traffic. This may also be understood as rule aging. If the node receives the packet that needs to be processed again, the node may read, from the SDN controller 210 based on forwarding information of the to-be-processed packet, the stored forwarding rule for processing the packet.

With reference to the architecture shown in FIG. 1, the following describes in detail the packet traffic processing method provided in this embodiment of this application by using an example in which the network node cluster 112 is a firewall (FW) cluster.

Figure 4:
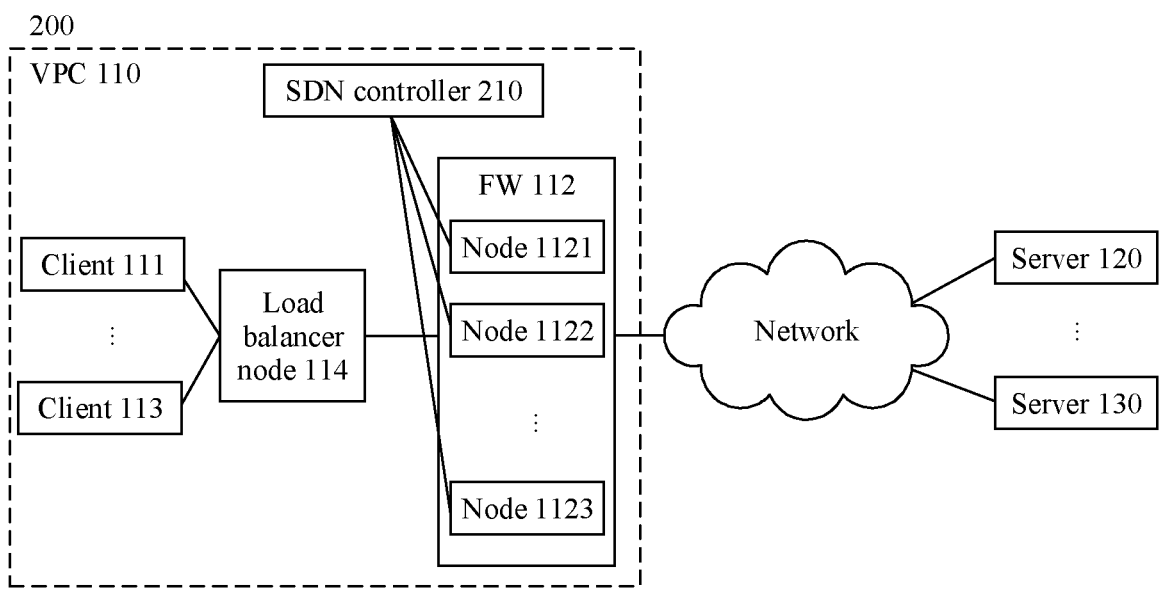
FIG. 4 is a schematic block diagram of another system architecture 400 for packet traffic forwarding according to an embodiment of this application.

FIG. 4 is a schematic block diagram of another system architecture 400 for packet traffic forwarding according to an embodiment of this application. As shown in FIG. 4, a network node cluster 112 is an FW cluster.

It should be understood that the FW cluster is a barrier between a private network and a public network, and may control entry and exit of a data packet according to a predefined forwarding rule. As a defense line of a system, the FW cluster is used to prevent an unauthorized user from accessing the system.

An SDN controller 210 may store a forwarding rule. After receiving packet traffic, any node in the network node cluster 112 obtains the forwarding rule from the controller 210, and determines, according to the forwarding rule, whether the packet traffic can be forwarded.

Figure 5A:
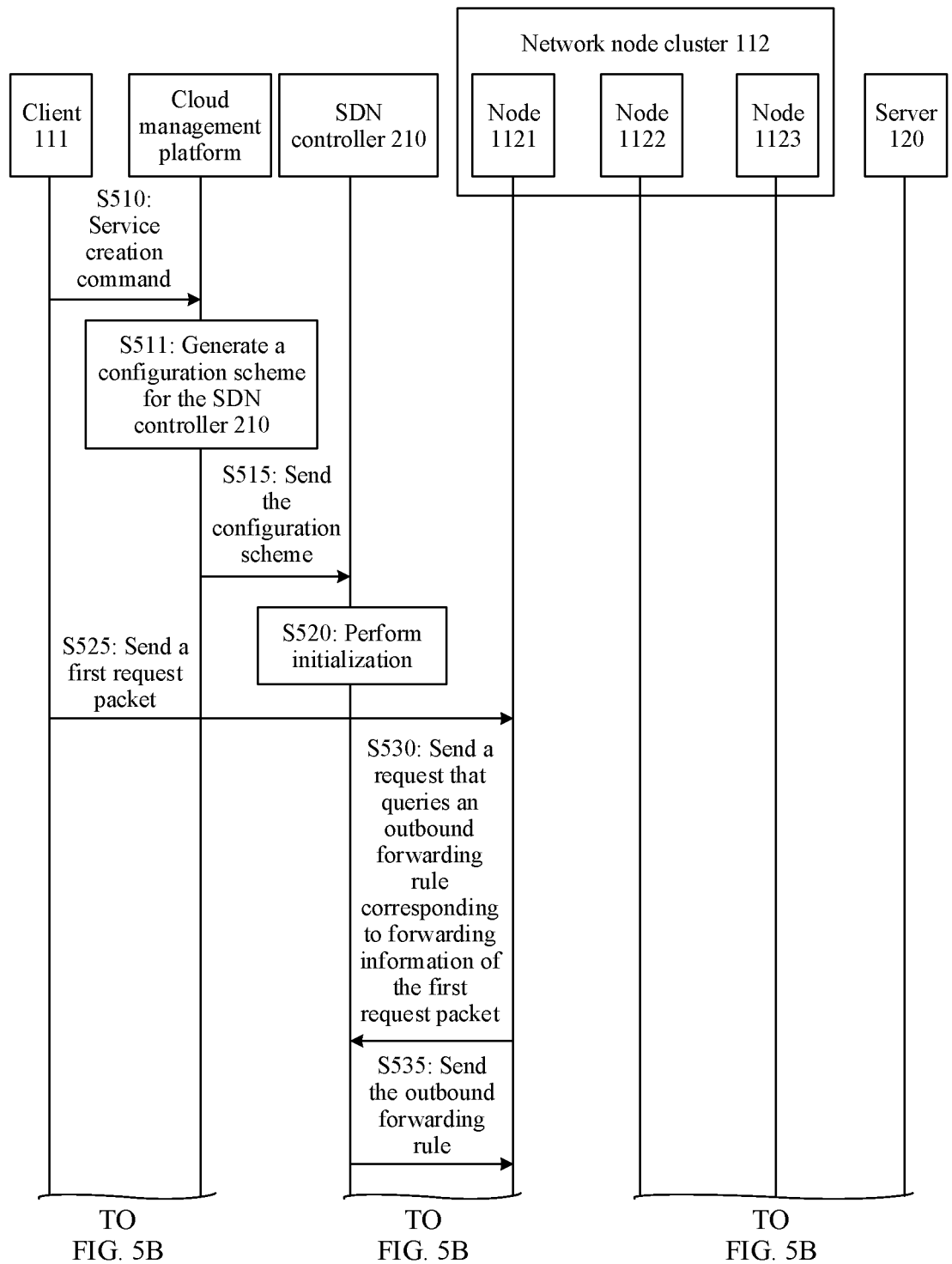
FIG. 5A and FIG. 5B are schematic flowcharts of another packet traffic processing method according to an embodiment of this application.
Figure 5B:
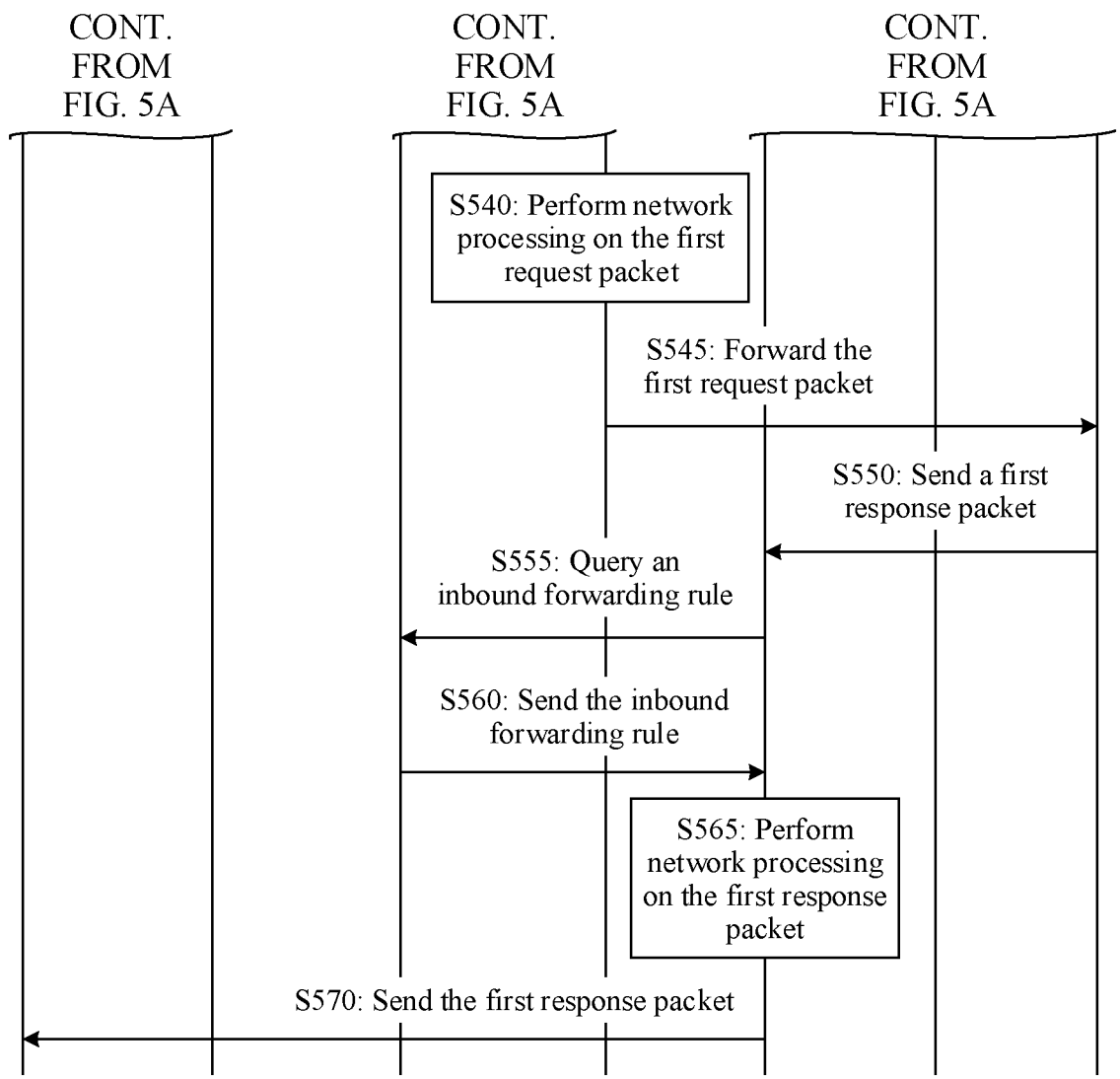

The following describes in detail a packet traffic processing method provided in an embodiment of this application with reference to FIG. 5A and FIG. 5B by using an example in which the network node cluster 112 shown in FIG. 4 is an FW cluster.

FIG. 5A and FIG. 5B are schematic flowcharts of another packet traffic processing method according to an embodiment of this application. The method shown in FIG. 5A and FIG. 5B may include steps 510 to 570. The following separately describes steps 510 to 570 in detail.

Step 510: A tenant sends a service creation command to a cloud management platform.

The step is corresponding to step 310. For details, refer to the descriptions in step 310, and details are not described herein again.

Step 511: The cloud management platform receives the command and generates a configuration scheme for an SDN controller according to the command.

The cloud management platform may generate the control scheme for the SDN controller 210 according to the service creation command. The control scheme may indicate the SDN controller 210 to create an FW service and perform initialization.

Step 515: The SDN controller 210 receives the configuration scheme sent by the cloud management platform.

The step is corresponding to step 315. For details, refer to the descriptions in step 315, and details are not described herein again.

Step 520: The SDN controller 210 performs initialization.

After receiving the configuration scheme sent by the cloud platform, the SDN controller 210 parses and creates the FW service. The SDN controller 210 may further create an empty FW forwarding configuration library corresponding to the FW service, and the FW forwarding configuration library may store an FW forwarding rule.

The SDN controller 210 may further configure a forwarding plane for each node in a network node cluster 112. This is used as an example, but not for limitation. The SDN controller 210 delivers an OPENFLOW flow table to each node in the network node cluster 112. The OPENFLOW flow table is used to indicate each node in the network node cluster 112 to send a query request to the SDN controller 210 when forwarding information of a received packet does not match the locally stored NAT forwarding entry. For details, refer to the descriptions in step 320, and details are not described herein again.

Step 525: A node 1121 receives a first request packet sent by a client 111 to a server 120.

For example, the client 111 sends the first request packet to the server 120, and the first request packet may be routed to a load balancer node 114. For example, a default gateway of the client 111 may be set to a network address of the load balancer node 114. When a destination address and the source address that are of the first request packet are not in a same range of subnets, the first request packet may be routed to the default gateway, the load balancer node 114 selects the node 1121 according to a load balancing policy, and sends the first request packet to the node 1121 in the network node cluster 112.

The first request packet sent by the client 111 to the server 120 may carry forwarding information, and the forwarding information records a sending direction of the first request packet as an outbound direction.

It should be understood that in this embodiment of this application, the outbound direction is a direction from the client to the server, and an inbound direction is a direction from the server to the client. The outbound direction may be understood as a packet sent from the client in a VPC 110 to the server outside the VPC 110, or a packet sent from a client in a local area network to a server outside the local area network. The inbound direction may be understood as a packet sent from the server outside the VPC 110 to the client in the VPC 110, or a packet sent from the server outside the local area network to the client in the local area network.

Step 530: The node 1121 sends a query request to the SDN controller 210, where the query request is used to query an outbound forwarding rule corresponding to the forwarding information of the first request packet.

After receiving the first request packet sent by the client 111, the node 1121 determines, based on the forwarding information of the first request packet, whether the node 1121 locally stores the outbound forwarding rule for processing the first request packet. If the node 1121 does not locally store the outbound forwarding rule, the node 1121 reports, based on the OPENFLOW flow table delivered by the SDN controller 210, the forwarding information of the first request packet to the SDN controller 210 for query.

Step 535: The SDN controller 210 delivers the outbound forwarding rule to the node 1121.

The forwarding information of the first request packet may be, for example, 5-tuple structure information (for example, a source IP address, a source port, a destination IP address, a destination port, and a packet type that are of the first request packet) of the first request packet. After receiving the query request, send by the node 1121, that is used to query the outbound forwarding rule corresponding to the forwarding information of the first request packet, the SDN controller 210 may configure the outbound forwarding rule based on the source network address and the destination network address that are of the first request packet. The outbound forwarding rule includes a correspondence between the source network address and the destination network address that are of the first packet.

It should be noted that the source network address of the first packet may be the source IP address of the first packet, or may be the source IP address and the source port that are of the first packet. The destination network address of the first packet may be the destination IP address of the first packet, or may be the destination IP address and the destination port that are of the first packet.

It should be understood that the outbound forwarding rule is used to indicate a node, in the network node cluster 112, that receives the outbound forwarding rule to determine whether a destination network address of a packet whose sending direction is the outbound direction is a preset network address. If the destination network address of the packet whose sending direction is the outbound direction is the preset network address, the node sends the packet whose sending direction is the outbound direction based on the destination network address of the packet whose sending direction is the outbound direction. If the destination network address of the packet whose sending direction is the outbound direction is not the preset network address, the node discards the packet whose sending direction is the outbound direction.

The SDN controller 210 may further configure an inbound forwarding rule based on the source network address and the destination network address that are of the first packet and that are recorded in the outbound forwarding rule. The inbound forwarding rule includes the correspondence between the source network address and the destination network address that are of the first packet.

It should be understood that the inbound forwarding rule is used to indicate a node, in the network node cluster 112, that receives the inbound forwarding rule to determine whether a destination network address of a packet whose sending direction is the inbound direction is the source network address of the first packet. If the destination network address of the packet whose sending direction is the inbound direction is the source network address of the first packet, the node sends the packet whose sending direction is the inbound direction based on the destination network address of the packet whose sending direction is the inbound direction. If the destination network address of the packet whose sending direction is the inbound direction is not the source network address of the first packet, the node discards the packet whose sending direction is the inbound direction.

In this embodiment of this application, the SDN controller 210 may further store the outbound forwarding rule and the inbound forwarding rule in the FW forwarding configuration library, so that after receiving a response packet corresponding to the first request packet, another node in the network node cluster 112 may directly obtain the inbound forwarding rule from the FW forwarding configuration library, and forward the response packet.

In an example, the IP address of the client 111 is 192.168.1.100, and the IP address of the server 120 is 67.18.2.23. The source IP address of the first request packet sent by the client 111 to the server 120 is 192.168.1.100, and the destination IP address of the first request packet (i.e., the IP address of the server 120) is 67.18.2.23. The outbound forwarding rule allows a packet whose source IP address is 192.168.1.100 and destination address is 67.18.2.23 to pass through. The inbound forwarding rule allows a packet whose source IP address is 67.18.2.23 and destination address is 192.168.1.100 to pass through.

Step 540: The node 1121 performs network processing on the first request packet according to the outbound forwarding rule delivered by the SDN controller 210.

The node 1121 may receive the outbound forwarding rule corresponding to the first request packet, and determine, according to the outbound forwarding rule, whether the source network address and the destination network address that are of the first request packet meet a condition.

For example, the source IP address of the first request packet sent by the client 111 to the server 120 is 192.168.1.100, and the destination IP address of the first request packet is 67.18.2.23. The node 1121 determines, based on that the outbound forwarding rule allows the packet whose source IP address is 67.18.2.23 and whose destination address is 192.168.1.100 to pass through, that the first request packet is allowed to pass through.

Step 545: The node 1121 forwards the first request packet to the server 120.

The packet traffic processing method provided in this embodiment of this application is further described in detail below by using FIG. 2 with reference to steps 550 to 570.

Step 550: The server 120 sends a first response packet to a node 1122.

After receiving the first request packet, the server 120 generates the first response packet based on the first request packet. The first response packet carries content required by the first request packet, for example, a web page. The first response packet carries forwarding information. The forwarding information includes a destination IP address, a destination port, a source IP address, a source port, and a protocol type. The source IP address of the first response packet is the IP address of the server 120, and the source port of the first response packet is a port, of the server 120, that provides a service. Because the source address of the packet is the IP address of the server 120, and the destination port of the packet is a public network port of the VPC, the forwarding information records a sending direction of the first response packet as an inbound direction.

The first response information sent by the server 120 is routed to a load balancer node based on the destination address of the server 120. The load balancer node selects a specific node in the network node cluster 112 according to the load balancing policy, and sends the first response packet to the node.

For ease of description, the following provides description by using an example in which the first response packet sent by the server 120 is sent by the load balancer node 114 to the node 1122 in the network node cluster 112.

Step 555: The node 1122 requests the SDN controller 210 to query the inbound forwarding rule.

After receiving the first response packet sent by the server 120, the node 1122 determines the direction of the first response packet based on the forwarding information of the first response packet, for example, the source IP address, the source port, the destination IP, the destination port, and the protocol type. Because the source IP address of the first response packet is the IP address of the server, and the destination IP address is a public IP address, the first response packet is an inbound packet.

The node 1122 further determines, based on the forwarding information of the first response packet, whether the node 1122 locally stores the inbound forwarding rule that matches the forwarding information of the first response packet. If the node 1122 does not locally store the inbound forwarding rule, the node 1122 reports, based on the OPENFLOW flow table delivered by the SDN controller 210, the forwarding information of the first request packet to the SDN controller 210 for query.

Step 560: The node 1122 receives the inbound forwarding rule delivered by the SDN controller 210.

After receiving a query request, send by the node 1122, that is used to query the inbound forwarding rule corresponding to the first response packet, the SDN controller 210 performs query in the FW forwarding configuration library based on the network address included in the forwarding information of the first response packet. If the first response packet is stateful traffic, in other words, the first response packet corresponds to the first request packet, the FW forwarding configuration library stores the outbound forwarding rule and the inbound forwarding rule corresponding to the outbound forwarding rule. The SDN controller 210 may deliver the inbound forwarding rule to the node 1122.

It should be understood that the SDN controller 210 may determine, based on that the destination network address of the first response packet is the source network address of the first packet, that the first response packet is a stateful-traffic packet of the first request packet.

Step 565: The node 1122 processes the first response packet according to the inbound forwarding rule.

The node 1121 may receive the inbound forwarding rule corresponding to the first request packet, and determine, according to the inbound forwarding rule, whether the source IP network address and the destination IP network address that are of the first response packet meet a condition.

For example, based on foregoing example, the source IP address of the first request packet sent by the client 111 to the server 120 is 192.168.1.100, and the destination IP address of the first request packet is 67.18.2.23. The node 1121 determines, based on that the inbound forwarding rule allows the packet whose source IP address is 67.18.2.23 and whose destination address is 192.168.1.100 to pass through, that the first request packet is allowed to pass through.

Step 570: The node 1122 forwards the first response packet to the client 111.

The step is corresponding to step 370. For details, refer to the descriptions in step 370, and details are not described herein again.

It may be understood that, in this embodiment of this application, each step may be performed in different sequences presented in this embodiment of this application, and not all operations in this embodiment of this application may need to be performed.

The foregoing describes in detail the packet traffic processing method provided in the embodiments of this application with reference to FIG. 1 to FIG. 5A and FIG. 5B. The following describes in detail apparatus embodiments of this application with reference to FIG. 6 and FIG. 7. It should be understood that descriptions of the method embodiments correspond to descriptions of the apparatus embodiments. Therefore, for a part that is not described in detail, refer to the foregoing method embodiments.

Figure 6:
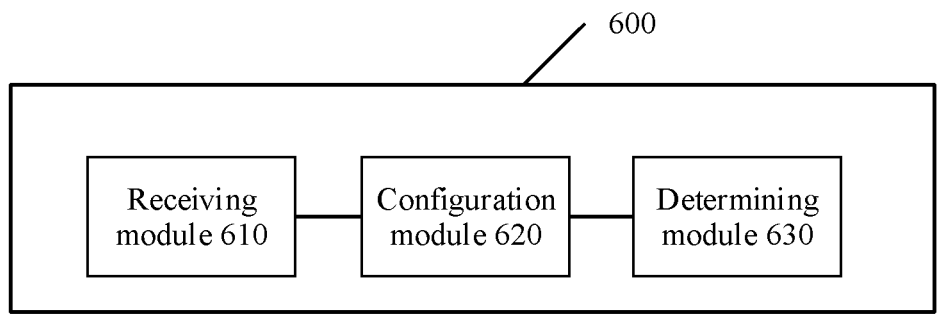
FIG. 6 is a schematic structural diagram of a control node 600 according to an embodiment of this application.

FIG. 6 is a schematic structural diagram of a control node 600 according to an embodiment of this application. It should be understood that the control node 600 is corresponding to the controller 210 in the foregoing description.

The control node 600 includes a receiving module 610 configured to receive a first query request sent by a first network processing node in the active-active cluster, where the first query request carries forwarding information of a first packet, and the forwarding information of the first packet records a sending direction of the first packet as an outbound direction, a configuration module 620 configured to configure an outbound forwarding rule based on the forwarding information of the first packet, generate an inbound forwarding rule whose direction is opposite to that of the outbound forwarding rule, record the outbound forwarding rule and the inbound forwarding rule, and send the outbound forwarding rule to the first network processing node, where the receiving module 610 is further configured to receive a second query request sent by a second network processing node in the active-active cluster, where the second query request carries forwarding information of a second packet, and the forwarding information of the second packet records a sending direction of the second packet as an inbound direction, and a determining module 630 configured to determine that the forwarding information of the second packet matches the inbound forwarding rule, obtain, based on the forwarding information of the second packet, the recorded inbound forwarding rule, and send the inbound forwarding rule to the second network processing node.

Optionally, the control node 600 records a public IP address and a range of available public network ports, and the forwarding information of the first packet includes a source IP address and a source port that are of the first packet.

The configuration module 620 is specially configured to select a public network port from the range of public network ports. The public network port one-to-one corresponds to the source IP address and the source port that are of the first packet. The outbound forwarding rule includes a correspondence between the source IP address and the source port that are of the first packet and the public IP address and the public network port. The outbound forwarding rule is used to indicate a network processing node, in the active-active cluster, that receives the outbound forwarding rule to modify a source IP address of a packet whose sending direction is the outbound direction to the public IP address and modify a source port of the packet whose sending direction is the outbound direction to the public network port.

Optionally, the configuration module 620 is further configured to generate the inbound forwarding rule based on the correspondence that is recorded in the outbound forwarding rule and that is between the source IP address and the source port that are of the first packet and the public IP address and the public network port. The inbound forwarding rule includes the correspondence between the source IP address and the source port that are of the first packet and the public IP address and the public network port. The inbound forwarding rule is used to indicate a network processing node, in the active-active cluster, that receives the inbound forwarding rule to modify a destination IP address of a packet whose sending direction is the inbound direction to the source address of the first packet and modify a destination port of the packet whose sending direction is the inbound direction to the source port of the first packet.

Optionally, the forwarding information of the second packet includes a destination IP address and a destination port that are of the second packet.

The determining module 630 is specially configured to determine that the destination IP address of the second packet is the public IP address, and determine that the destination port of the second packet is the public network port.

Optionally, the first packet is sent by a client to a server, the client and the active-active cluster are set in a VPC network, and the public IP address is set in the VPC network.

Optionally, the forwarding information of the first packet includes the source network address and a destination network address that are of the first packet. The configuration module 620 is further configured to configure the outbound forwarding rule based on the source network address and the destination network address that are of the first packet. The outbound forwarding rule includes a correspondence between the source network address and the destination network address that are of the first packet. The outbound forwarding rule is used to indicate a network processing node, in the active-active cluster, that receives the outbound forwarding rule to determine whether a destination network address of a packet whose sending direction is the outbound direction is a preset network address. If the destination network address of the packet whose sending direction is the outbound direction is the preset network address, the configuration module 620 sends the packet whose sending direction is the outbound direction based on the destination network address of the packet whose sending direction is the outbound direction. If the destination network address of the packet whose sending direction is the outbound direction is not the preset network address, the configuration module 620 discards the packet whose sending direction is the outbound direction.

Optionally, the configuration module 620 is further configured to configure the inbound forwarding rule based on the source network address and the destination network address that are of the first packet and that are recorded in the outbound forwarding rule. The inbound forwarding rule includes the correspondence between the source network address and the destination network address that are of the first packet. The inbound forwarding rule is used to indicate a network processing node, in the active-active cluster, that receives the inbound forwarding rule to determine whether a destination network address of a packet whose sending direction is the inbound direction is the source network address of the first packet. If the destination network address of the packet whose sending direction is the inbound direction is the source network address of the first packet, the configuration module 620 sends the packet whose sending direction is the inbound direction based on the destination network address of the packet whose sending direction is the inbound direction. If the destination network address of the packet whose sending direction is the inbound direction is not the source network address of the first packet, the configuration module 620 discards the packet whose sending direction is the inbound direction.

Optionally, the forwarding information of the second packet includes the destination network address of the second packet. The determining module 630 is further configured to determine that the destination network address of the second packet is the source network address of the first packet.

It should be understood that the control node 600 in this embodiment of this application may be implemented by using an application-specific integrated circuit (ASIC), or may be implemented through a programmable logic device (PLD). The PLD may be a complex PLD (CPLD), a field-programmable gate array (FPGA), generic array logic (GAL), or any combination thereof. Alternatively, when the methods shown in FIG. 2 to FIG. 5A and FIG. 5B may be implemented by using software, the control node 600 and modules of the control node 600 may be software modules.

A specific function of each functional module is also described in the embodiments shown in FIG. 2 to FIG. 5A and FIG. 5B, and details are not described herein again.

Figure 7:
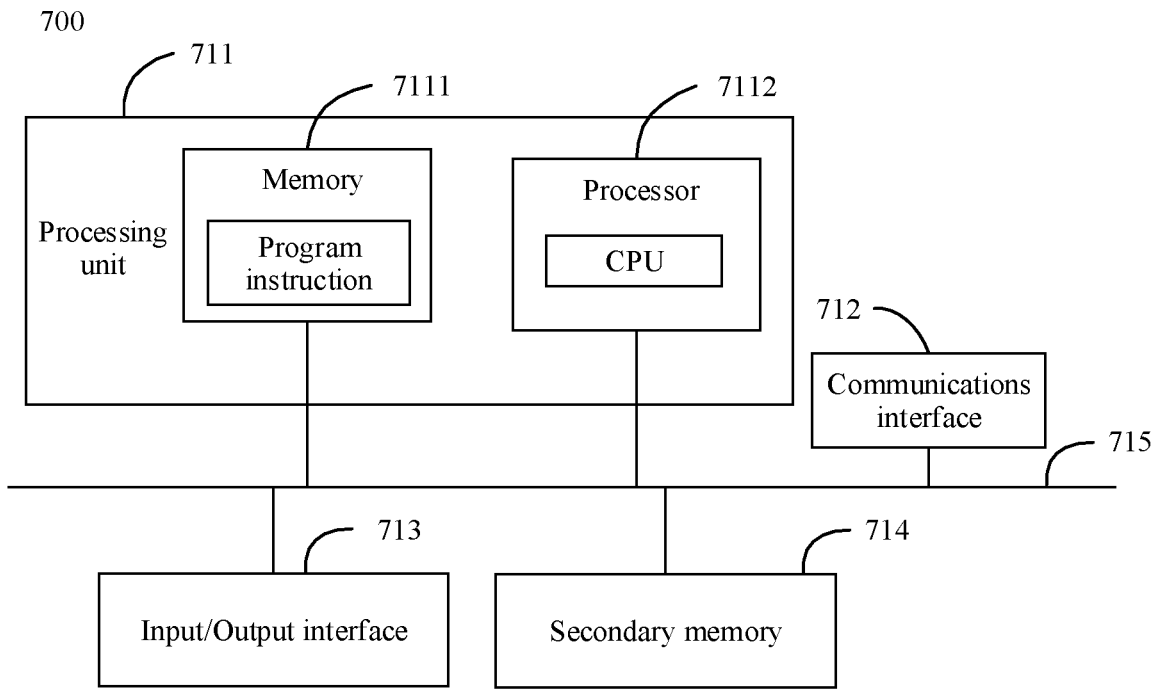
FIG. 7 is a schematic structural diagram of a control node 700 according to an embodiment of this application.

FIG. 7 is a schematic structural diagram of a control node 700 according to an embodiment of this application. The control node 700 includes a processing unit 711 and a communications interface 712. The processing unit 711 is configured to perform functions defined by various software programs. For example, the processing unit 711 is configured to implement a function of the control node 700. The communications interface 712 is configured to communicate and interact with another computing node. The other device may be another physical server. Further, the communications interface 712 may be a network adapter.

Optionally, the control node 700 may further include an input/output interface 713. The input/output interface 713 is connected to an input/output device and is configured to receive input information and output an operation result. The input/output interface 713 may be a mouse, a keyboard, a display, a compact-disc (CD) read-only memory (ROM) (or CD-ROM) drive, or the like. Optionally, the control node 700 may further include a secondary memory 714. The secondary memory is generally referred to as an external memory. A storage medium of the secondary memory 714 may be a magnetic medium (for example, a floppy disk, a hard disk, or a magnetic tape), an optical medium (for example, an optical disc), a semiconductor medium (for example, a solid-state drive), or the like.

Optionally, the control node 700 may further include a bus 715. The processing unit 711, the communications interface 712, the input/output interface 713, and the secondary memory 714 may be connected through the bus 715. The bus 715 may be a Peripheral Component Interconnect (PCI) bus, an Extended Industry Standard Architecture (EISA) bus, and or the like. The bus 715 may be classified into an address bus, a data bus, a control bus, and the like. For ease of representation, only one line is used to represent the bus in FIG. 7, but this does not mean that there is only one bus or only one type of bus.

The processing unit 711 may have a plurality of specific implementation forms. For example, the processing unit 711 may include a processor 7112 and a memory 7111. The processor 7112 performs, according to program instructions stored in the memory 7111, related operations in the embodiments shown in FIG. 1 to FIG. 5A and FIG. 5B. The processor 7112 may be a central processing unit (CPU). The processor may be a general purpose processor, a digital signal processor (DSP), an ASIC, an FPGA, or another PLD, a discrete gate or transistor logic device, or a discrete hardware component. The general purpose processor may be a microprocessor, or the processor may be any conventional processor or the like. Alternatively, the processor 710 is configured to execute a related program by using one or more integrated circuits, to implement technical solutions provided in the embodiments of this application.

The foregoing and other operations and/or functions of the units in the control node 700 are separately used to implement corresponding procedures of the methods in FIG. 2 to FIG. 5A and FIG. 5B. For brevity, details are not described herein again.

All or some of the foregoing embodiments may be implemented by using software, hardware, firmware, or any combination thereof. When the software is used to implement the embodiments, the foregoing embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DIGITAL VERSATILE DISC (DVD)), or a semiconductor medium. The semiconductor medium may be a solid-state drive (SSD).

A person of ordinary skill in the art may be aware that, in combination with the examples described in the embodiments disclosed in this specification, units and algorithm steps may be implemented by electronic hardware or a combination of computer software and electronic hardware. Whether the functions are performed by the hardware or the software depends on particular applications and design constraints of the technical solutions. A person skilled in the art may use different methods to implement the described functions for each particular application.

It may be clearly understood by the person skilled in the art that, for a purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve objectives of the solutions of the embodiments.

The foregoing descriptions are merely specific implementations of this application. Any variation or replacement readily figured out by the person skilled in the art based on the specific implementations provided in this application shall fall within the protection scope of this application.

What is claimed is:

1. An active-active cluster control method implemented by a control node, wherein the active-active cluster control method comprises:
    receiving, from a first network processing node in an active-active cluster, a first query request carrying first forwarding information of a first packet, wherein the first forwarding information records a first sending direction of the first packet as an outbound direction;
    configuring an outbound forwarding rule based on the first forwarding information;
    generating an inbound forwarding rule whose direction is opposite to that of the outbound forwarding rule;
    recording the outbound forwarding rule and the inbound forwarding rule;
    sending the outbound forwarding rule to the first network processing node;
    receiving, from a second network processing node in the active-active cluster, a second query request carrying second forwarding information of a second packet, wherein the second forwarding information records a second sending direction of the second packet as an inbound direction;
    determining that the second forwarding information matches the inbound forwarding rule;
    obtaining, based on the second forwarding information, the inbound forwarding rule; and
    sending the inbound forwarding rule to the second network processing node.

2. The active-active cluster control method of claim 1, further comprising recording a public Internet Protocol (IP) address and a range of available public network ports, wherein the first forwarding information comprises a first source IP address of the first packet and a first source port of the first packet; wherein the configuring comprises selecting a public network port from the range of available public network ports, wherein the public network port corresponds in a one-to-one manner to the first source IP address and the first source port, wherein the outbound forwarding rule comprises a correspondence between the first source IP address and the first source port and the public IP address and the public network port, and wherein the outbound forwarding rule instructs a third network processing node, in the active-active cluster, that receives the outbound forwarding rule to modify a second source IP address of a third packet that comprises a third sending direction as the outbound direction to the public IP address and to modify a second source port of the third packet to the public network port.

3. The active-active cluster control method of claim 2, further comprising further generating the inbound forwarding rule based on the correspondence that is recorded in the outbound forwarding rule, wherein the inbound forwarding rule comprises the correspondence, and wherein the inbound forwarding rule instructs a fourth network processing node, in the active-active cluster, that receives the inbound forwarding rule to modify a first destination IP address of a fourth packet that comprises a fourth sending direction as the inbound direction to the first source IP address and to modify a first destination port of the fourth packet to the first source port.

4. The active-active cluster control method of claim 3, wherein the second forwarding information comprises a second destination IP address of the second packet and a second destination port of the second packet, and wherein determining that the second forwarding information matches the inbound forwarding rule comprises:
    determining that the second destination IP address is the public IP address; and
    determining that the second destination port is the public network port.

5. The active-active cluster method of claim 2, wherein the first packet is received from a client to a server, wherein the client and the active-active cluster are set in a virtual private cloud (VPC) network, and wherein the public IP address is set in the VPC network.

6. The active-active cluster control method of claim 1, wherein the first forwarding information comprises a first source network address of the first packet and a first destination network address of the first packet, and wherein the configuring comprises:
    further configuring the outbound forwarding rule based on the first source network address and the first destination network address, wherein the outbound forwarding rule comprises a correspondence between the first source network address and the first destination network address, and wherein the outbound forwarding rule instructs a third network processing node, in the active-active cluster, that receives the outbound forwarding rule to determine whether a second destination network address of a third packet that comprises a third sending direction is as the outbound direction is a preset network address;
    sending the third packet based on the second destination network address when the second destination network address is the preset network address; and
    discarding the third packet when the second destination network address is not the preset network address.

7. The active-active cluster control method of claim 6, wherein the generating comprises:
    configuring the inbound forwarding rule based on the first source network address and the first destination network address in the outbound forwarding rule, wherein the inbound forwarding rule comprises the correspondence, and wherein the inbound forwarding rule instructs a fourth network processing node, in the active-active cluster, that receives the inbound forwarding rule to determine whether a third destination network address of a fourth packet that comprises a fourth sending direction as the inbound direction is the first source network address;
    sending the fourth packet based on the third destination network address when the third destination network address is the first source network address; and
    discarding the fourth packet when the third destination network address is not the first source network address.

8. The active-active cluster control method of claim 7, wherein the second forwarding information comprises a fourth destination network address of the second packet, and wherein the determining further determining that the fourth destination network address is the first source network address.

9. A control node comprising:
    a memory configured to store computer-executable instructions; and a processor coupled to the memory, wherein when executed by the processor, the computer-executable instructions cause the control node to:
receive, from a first network processing node in an active-active cluster, a first query request carrying first forwarding information of a first packet, wherein the first forwarding information records a first sending direction of the first packet as an outbound direction;
configure an outbound forwarding rule based on the first forwarding information;
generate an inbound forwarding rule whose direction is opposite to that of the outbound forwarding rule;
record the outbound forwarding rule and the inbound forwarding rule;
send the outbound forwarding rule to the first network processing node;
receive, from a second network processing node in the active-active cluster, a second query request carrying second forwarding information of a second packet, wherein the second forwarding information records a second sending direction of the second packet as an inbound direction;
determine that the second forwarding information matches the inbound forwarding rule;
obtain, based on the second forwarding information, the inbound forwarding rule; and
send the inbound forwarding rule to the second network processing node.

10. The control node of claim 9, wherein when executed by the processor, the computer-executable instructions cause the control node to;
record a public Internet Protocol (IP) address and a range of available public network ports, wherein the first forwarding information comprises a first source IP address of the first packet and a first source port of the first packet; and
select a public network port from the range of available public network ports, wherein the public network port corresponds in a one-to-one to the first source IP address and the first source port, wherein the outbound forwarding rule comprises a correspondence between the first source IP address and the first source port and the public IP address and the public network port, and wherein the outbound forwarding rule instructs a third network processing node, in the active-active cluster, that receives the outbound forwarding rule to modify a second source IP address of a third packet that comprises a third sending direction as the outbound direction to the public IP address and to modify a second source port of the third packet.

11. The control node of claim 10, wherein when executed by the processor, the computer-executable instructions further cause the control node to further generate the inbound forwarding rule based on the correspondence wherein the inbound forwarding rule comprises the correspondence, and wherein the inbound forwarding rule is instructs a fourth network processing node, in the active-active cluster, that receives the inbound forwarding rule to modify a first destination IP address of a fourth packet that comprises a fourth sending direction as the inbound direction to the first source address and to modify a first destination port of the fourth packet to the first source port.

12. The control node of claim 11, wherein the second forwarding information comprises a second destination IP address of the second packet and a second destination port of the second packet, and wherein when executed by the processor, the computer-executable instructions further cause the control node to:
determine that the second destination IP address is the public IP address; and
determine that the second destination port is the public network port.

13. The control node of claim 10, wherein the first packet is rom a client to a server, wherein the client and the active-active cluster are set in a virtual private cloud (VPC) network, and wherein the public IP address is set in the VPC network.

14. The control node of claim 9, wherein the first forwarding information comprises a first source network address of the first packet and a first destination network address of the first packet, and wherein when executed by the processor, the computer-executable instructions further cause the control node to:
further configure the outbound forwarding rule based on the first source network address and the first destination network address, wherein the outbound forwarding rule comprises a correspondence between the first source network address and the first destination network address, and wherein the outbound forwarding rule instructs a third network processing node, in the active-active cluster, that receives the outbound forwarding rule to determine whether a second destination network address of a third packet that comprises a third sending direction as the outbound direction is a preset network address;
send the third packet based on the second destination network address when the second destination network address is the preset network address; and
discard the third packet when the second destination network address is not the preset network address.

15. The control node of claim 14, wherein when executed by the processor, the computer-executable instructions further cause the control node to:
configure the inbound forwarding rule based on the first source network address and the first destination network address in the outbound forwarding rule, wherein the inbound forwarding rule comprises the correspondence, and wherein the inbound forwarding rule instructs a fourth network processing node, in the active-active cluster, that receives the inbound forwarding rule to determine whether a third destination network address of a fourth packet that comprises a fourth sending direction as the inbound direction is the first source network address;
send the fourth packet based on the third destination network address when the third destination network address is the first source network address; and
discard the fourth packet when the third destination network address is not the first source network address.

16. The control node of claim 15, wherein the second forwarding information comprises a fourth destination network address of the second packet, and wherein when executed by the processor, the computer-executable instructions further cause the control node to: determine that the fourth destination network address is the first source network address of the first packet.

17. A computer program product comprising computer-executable instructions that are stored on a non-transitory computer-readable medium and that, when executed by a processor, cause a control node to:
receive, from a first network processing node in an active-active cluster, a first query request carrying first forwarding information of a first packet, wherein the first forwarding information records a first sending direction of the first packet as an outbound direction;

configure an outbound forwarding rule based on the first forwarding information;

generate an inbound forwarding rule whose direction is opposite to that of the outbound forwarding rule;

record the outbound forwarding rule and the inbound forwarding rule;

send the outbound forwarding rule to the first network processing node;

receive, from a second network processing node in the active-active cluster, a second query request carrying second forwarding information of a second packet, wherein the second forwarding information records a second sending direction of the second packet as an inbound direction;

determine that the second forwarding information matches the inbound forwarding rule;

obtain, based on the second forwarding information, the inbound forwarding rule; and send the inbound forwarding rule to the second network processing node.

18. The computer program product of claim 17, wherein the computer-executable instructions further cause the control node to:

record a public Internet Protocol (IP) address and a range of available public network ports, wherein the first forwarding information comprises a first source IP address of the first packet and a first source port of the first packet; and select a public network port from the range of available public network ports, wherein the public network port corresponds in a one-to-one to the first source IP address and the first source port, wherein the outbound forwarding rule comprises a correspondence between the first source IP address and the first source port and the public IP address and the public network port, and wherein the outbound forwarding rule instructs a third network processing node, in the active-active cluster, that receives the outbound forwarding rule to modify a second source IP address of a third packet that comprises a third sending direction as the outbound direction to the public IP address and to modify a second source port of the third packet.

19. The computer program product of claim 18, wherein the computer-executable instructions further cause the control node to further generate the inbound forwarding rule based on the correspondence, wherein the inbound forwarding rule comprises the correspondence, and wherein the inbound forwarding rule instructs a fourth network processing node, in the active-active cluster, that receives the inbound forwarding rule to modify a first destination IP address of a fourth packet that comprises a fourth sending direction as the inbound direction to the first source address and to modify a first destination port of the fourth packet to the first source port.

20. The computer program product of claim 19, wherein the second forwarding information comprises a second destination IP address of the second packet and a second destination port of the second packet, and wherein the computer-executable instructions further cause the control node to:

determine that the second destination IP address is the public IP address; and determine that the second destination port is the public network port.

* * * * *

UNITED STATES PATENT AND TRADEMARK OFFICE
CERTIFICATE OF CORRECTION

PATENT NO. : 11,729,102 B2  
APPLICATION NO. : 17/534586  
DATED : August 15, 2023  
INVENTOR(S) : Junwu Li and Si Shen Page 1 of 1

It is certified that error appears in the above-identified patent and that said Letters Patent is hereby corrected as shown below:

In the Claims

Claim 6, Column 28, Line 34: "direction is as the" should read "direction as the"

Claim 11, Column 29, Line 58: "rule is instructs" should read "rule instructs"

Claim 13, Column 30, Line 9: "is rom a client" should read "is from a client"

Signed and Sealed this  
Tenth Day of October, 2023

Katherine Kelly Vidal  
*Director of the United States Patent and Trademark Office*